(No Model.) 2 Sheets—Sheet 1.

A. WALKER.
GEAR WHEEL.

No. 479,233. Patented July 19, 1892.

Witnesses.
Robert Everett.
Dennis Sumby.

Inventor:
Alexander Walker.
By James L. Norris.
Atty.

(No Model.)  2 Sheets—Sheet 2.

A. WALKER.
GEAR WHEEL.

No. 479,233. Patented July 19, 1892.

Witnesses.
Robert Garrett.
Dennis Sumby.

Inventor.
Alexander Walker.
By James L. Norris.
Atty.

UNITED STATES PATENT OFFICE.

ALEXANDER WALKER, OF WHAT CHEER, IOWA, ASSIGNOR OF ONE-HALF TO WILLIAM THOMPSON, OF SAME PLACE.

GEAR-WHEEL.

SPECIFICATION forming part of Letters Patent No. 479,233, dated July 19, 1892.

Application filed April 2, 1892. Serial No. 427,506. (No model.)

*To all whom it may concern:*

Be it known that I, ALEXANDER WALKER, a citizen of the United States, residing at What Cheer, in the county of Keokuk and State of Iowa, have invented new and useful Improvements in Gear-Wheels, of which the following is a specification.

In mining and other drills, agricultural machines, and machinery in general where a bevel-gear meshes into and drives another bevel-gear and is mounted on a rotary shaft the hub of the driving bevel-gear usually rests at one end against a non-rotary bearing, in consequence of which the hub wears away and the two bevel-gears do not properly mesh, so that the points of the teeth become worn thin.

The objects of my invention are to avoid this objection and to render the hollow or tubular hub of the driving-gear susceptible of accurate adjustment against this bearing to compensate for wear and maintain the driving-gear in correct mesh with another gear in such manner that when the end of the hub is worn the latter can be adjusted up to its bearing independent of any movement of the bevel-gear carried by such hub, and therefore the bevel-gearing is preserved in proper mesh so that the points of the teeth are not liable to wear thin and the gears are rendered more durable and efficient.

To accomplish these objects, my invention consists, essentially, in a gear-wheel having a hollow hub adapted to fit a drive-shaft, and which is adjustable independent of the wheel.

The invention also consists in the features of construction and the combination or arrangement of devices hereinafter described and claimed, reference being made to the accompanying drawings, in which—

Figure 1:
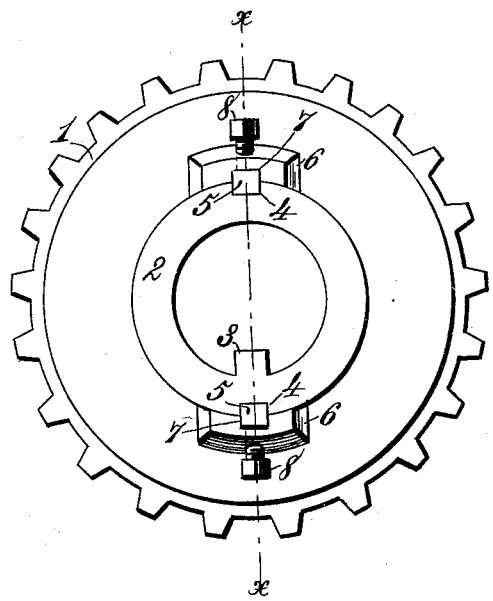
Figure 2:
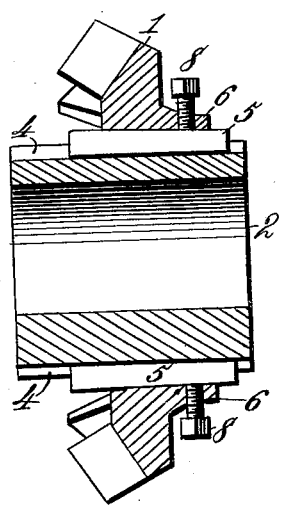
Figure 3:
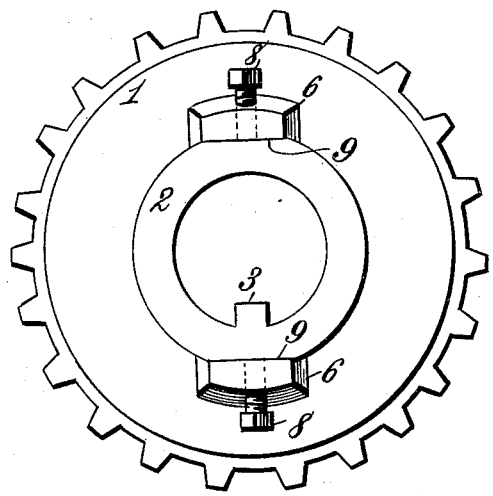
Figure 4:
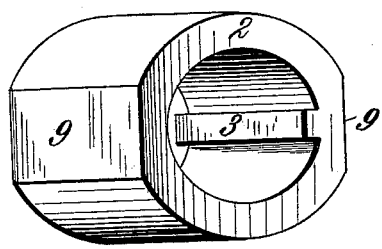
Figure 5:
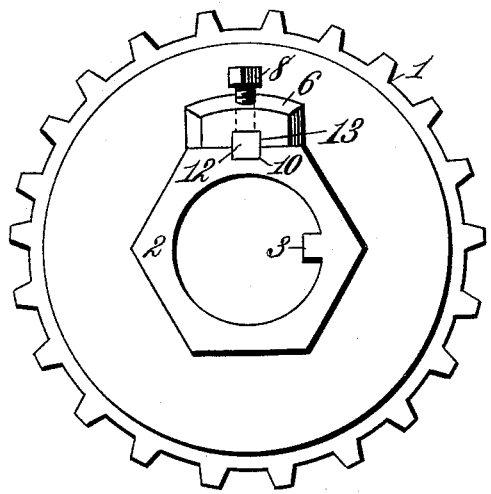
Figure 7:
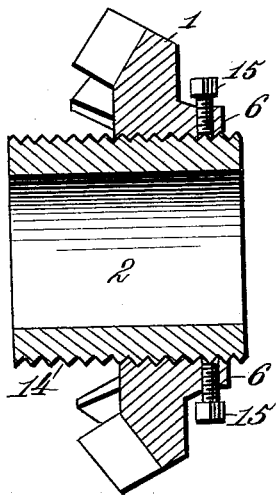
Figure 6:
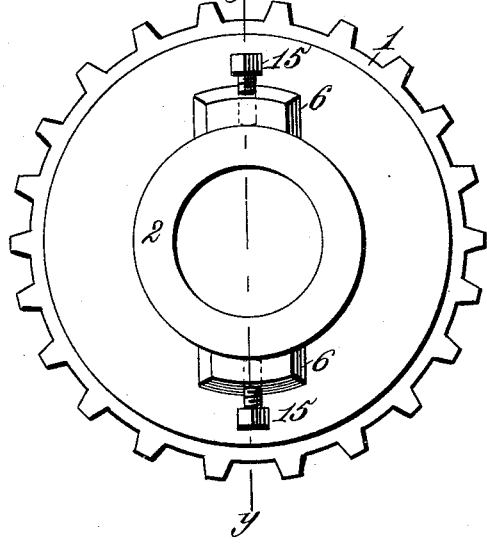

Figure 1 is a side elevation of a bevel gear-wheel constructed in accordance with my invention. Fig. 2 is a sectional view of the same, taken on the line *x x*, Fig. 1. Fig. 3 is a side elevation showing a modification of the invention. Fig. 4 is a detail perspective view of the hollow hub used in the modified construction Fig. 3. Fig. 5 is a side elevation of another modification. Fig. 6 is a side elevation showing a further modification, and Fig. 7 is a sectional view taken on the line *y y*, Fig. 6.

In order to enable those skilled in the art to make and use my invention, I will now describe the same in detail, referring to the drawings, wherein—

The numeral 1 indicates a gear-wheel, which, as here shown, is in the form of a bevel-gear. The center of the gear-wheel is formed with an orifice to receive the hollow hub 2, which, as illustrated in Figs. 1 and 2, is cylindrical and is formed or otherwise provided interiorly with a key or feather 3 for securing it to a suitable driving-shaft, so that the hub can be moved lengthwise on the shaft, but must rotate therewith. The exterior of the hollow hub is provided with key-seats 4 to receive keys or wedges 5, and the gear-wheel is formed integral at one side with lateral projections 6, containing key-seats 7 to receive the keys 5. The lateral projections 6 are constructed to receive set-screws 8, which can be tightened up against the keys 5 for locking the gear-wheel rigidly to the hollow hub, whereby the hub and wheel are held against movement independent of each other, while permitting the hub to be adjusted lengthwise through the gear-wheel by loosening the set-screws and keys or wedges.

In Figs. 3 and 4 the hollow hub 2 is constructed at its exterior with opposite flattened surfaces 9, and the central orifice in the gear-wheel is correspondingly shaped to fit the hub. The lateral projections 6 on the gear-wheel and the set-screws 8 are substantially the same as described with reference to Figs. 1 and 2; but the set-screws at their inner extremities rest against the flattened surfaces 9 of the hollow hub 2 for the purpose of rigidly locking the wheel and hub together after the hub has been adjusted lengthwise to the desired position. The hub is provided at its interior with a key or feather 3 for engaging a driving-shaft, as before explained. The flattened surfaces 9 of the hollow hub effectually prevent the hub and wheel from turning independent of each other.

In Fig. 5 the hollow hub 2 is formed with a cylindrical bore; but its exterior is hexagonal and one of the flattened surfaces is provided with a key-seat 10 to receive a key 12, which engages a key-seat 13 in the gear-wheel, substantially as before explained, so that the set-screw 8, carried by the lateral projection 6 of the gear-wheel, can act on the key or wedge 12 for the purpose of adjusting the hollow hub lengthwise through the gear-wheel and then locking these parts rigidly together.

In the modified construction, Figs. 6 and 7 the hollow hub 2 is provided at its exterior with a screw-thread 14, and the orifice in the gear-wheel 1 is screw-threaded to receive the threaded part of the hub, so that the latter can be adjusted lengthwise through the gear-wheel, after which the gear-wheel and hub are rigidly connected together through the medium of set-screws 15 or other suitable devices.

The invention is particularly useful in mining-drills, but is adapted to other drills, agricultural machines, and machinery in general where a gear-wheel meshing into and driving another gear-wheel is mounted on a rotary shaft so that the hub of the driving gear-wheel bears or rest against a non-rotary bearing. In such situations the hub will wear away by contact with the non-rotary bearing, and consequently the gears are not maintained in proper mesh and the points of the teeth become worn thin, which necessitates renewal of the gears. This is avoided by my invention, as the hub when it wears away at one end can be adjusted lengthwise through the gear-wheel and the gearing can be preserved in proper mesh so that the points of the teeth are not liable to wear thin.

The form or shape of the hollow hub can be variously modified in cross-section and devices other than those described can be employed for the purpose of rigidly connecting the hub and the gear-wheel after the hub has been adjusted lengthwise through the wheel.

Having thus described my invention, what I claim is—

1. A gear-wheel having a hollow hub which is adjustable lengthwise through the wheel independent of the latter, substantially as described.

2. A gear-wheel having a hollow hub which is adjustable lengthwise through the wheel independent thereof, combined with means for rigidly locking the wheel and hub together after the desired adjustment is effected, substantially as described.

3. A gear-wheel having a hollow hub which is adjustable lengthwise through the wheel, combined with set-screws carried by the wheel for rigidly connecting the wheel and hub together after the desired adjustment is effected, substantially as described.

4. A gear-wheel having a hollow hub provided interiorly with a key or feather and adjustable lengthwise through the wheel, combined with devices carried by the wheel for rigidly connecting the latter to the hub after the desired adjustment of the parts is effected, substantially as described.

5. A gear-wheel having a hollow hub provided exteriorly with a key-seat, a key or wedge engaging the key-seat and a part of the gear-wheel, and a set-screw carried by the gear-wheel and acting against the key or wedge, whereby the hub can be adjusted lengthwise through the wheel and then rigidly connected therewith, substantially as described.

In testimony whereof I have hereunto set my hand and affixed my seal in presence of two subscribing witnesses.

ALEXANDER WALKER. [L. S.]

Witnesses:
I. N. SOUTHWICK,
JAMES DAVISON.